(12) United States Patent
Carr et al.

(10) Patent No.: US 7,147,183 B1
(45) Date of Patent: Dec. 12, 2006

(54) LIFT SYSTEM FOR AN AERIAL CRANE AND PROPULSION SYSTEM FOR A VEHICLE

(76) Inventors: Robert Jonathan Carr, 124 Chickasaw La., Yukon, OK (US) 73099; James Michael Higgins, 1221 NW. 16th, Oklahoma City, OK (US) 73106-4401

(*) Notice: Subject to any disclaimer, the term of this patent is extended or adjusted under 35 U.S.C. 154(b) by 0 days.

(21) Appl. No.: 10/762,711

(22) Filed: Jan. 22, 2004

(51) Int. Cl.
*B64C 39/06* (2006.01)

(52) U.S. Cl. .................. 244/12.2; 244/23 C; 244/73 B

(58) Field of Classification Search ............... 244/12.1, 244/23 C, 73 B, 73 C, 207
See application file for complete search history.

(56) References Cited

U.S. PATENT DOCUMENTS

| | | | |
|---|---|---|---|
| 1,299,117 A | 4/1919 | Buchanan | |
| 2,108,652 A * | 2/1938 | Coanda | 244/73 B |
| D185,546 S | 6/1959 | Geraci | D34/15 |
| 2,922,277 A * | 1/1960 | Bertin | 244/12.2 |
| 2,996,266 A * | 8/1961 | Rebasti | 244/12.2 |
| 3,275,090 A * | 9/1966 | Weiland | 180/130 |
| 3,469,802 A * | 9/1969 | Alexander et al. | 244/12.2 |
| 3,489,374 A * | 1/1970 | Morcom | 244/12.2 |
| 3,651,583 A | 3/1972 | Clark et al. | 35/12 B |
| 3,785,592 A * | 1/1974 | Kerruish | 244/12.2 |
| 3,834,654 A | 9/1974 | Miranda | 244/13 |
| 3,942,747 A | 3/1976 | Wolkovitch | 244/13 |
| 4,053,125 A | 10/1977 | Ratony | 244/46 |
| 4,146,199 A | 3/1979 | Wenzel | 244/45 R |
| 4,365,773 A | 12/1982 | Wolkovitch | 244/45 R |
| D268,107 S | 3/1983 | Enav et al. | D12/331 |
| 4,856,736 A | 8/1989 | Adkins et al. | 244/45 R |
| D304,821 S | 11/1989 | Ratony | D12/331 |
| 4,941,628 A * | 7/1990 | Sakamoto et al. | 244/12.2 |
| D311,720 S | 10/1990 | Butler | D12/331 |
| 5,261,228 A * | 11/1993 | Shuba | 60/226.3 |
| 5,503,351 A * | 4/1996 | Vass | 244/34 A |
| 5,845,482 A * | 12/1998 | Carscallen | 60/785 |
| 5,899,409 A | 5/1999 | Frediani | 244/13 |
| 6,190,484 B1 | 2/2001 | Appa | 156/189 |
| 6,474,604 B1 | 11/2002 | Carlow | 244/199 |
| 6,659,369 B1 | 12/2003 | Foster et al. | 239/333 |

FOREIGN PATENT DOCUMENTS

| | | | | |
|---|---|---|---|---|
| DE | 3509-689 A | | 9/1986 | |
| FR | 83262 | * | 3/1963 | 244/12.2 |
| WO | WO88/05011 | | 7/1988 | |

* cited by examiner

*Primary Examiner*—Galen Barefoot
(74) *Attorney, Agent, or Firm*—Gable Gotwals

(57) ABSTRACT

The present invention provides an improved lift system for an aerial crane incorporating a wing, coanda and curved surface. The arrangement of the wing, coanda and curved surface use and induce airflow to create additional lift through an increase in airflow mass, density and velocity. A different configuration of the wing, coanda and curved surface can be used to propel a vehicle.

35 Claims, 4 Drawing Sheets

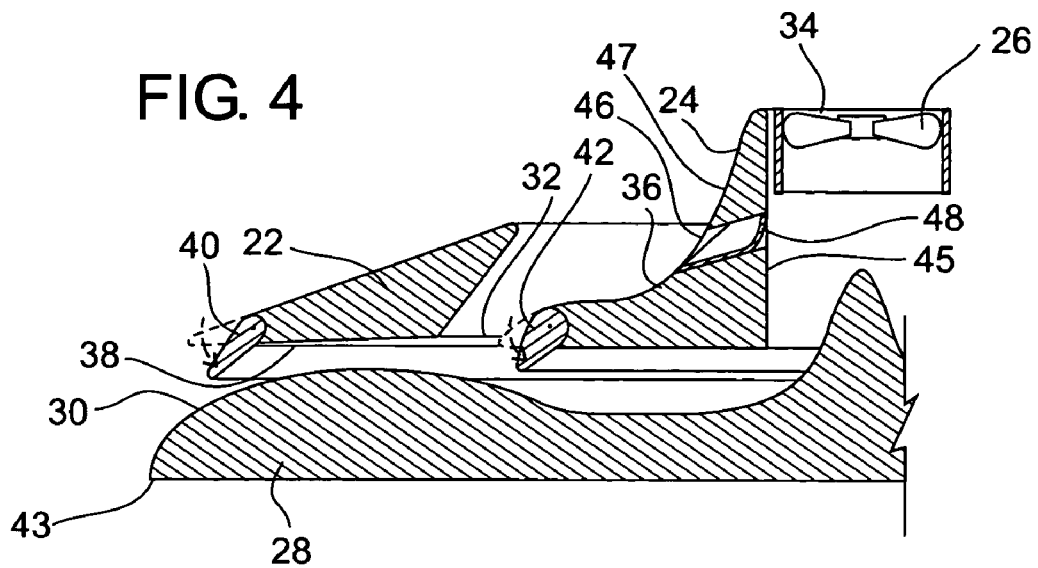
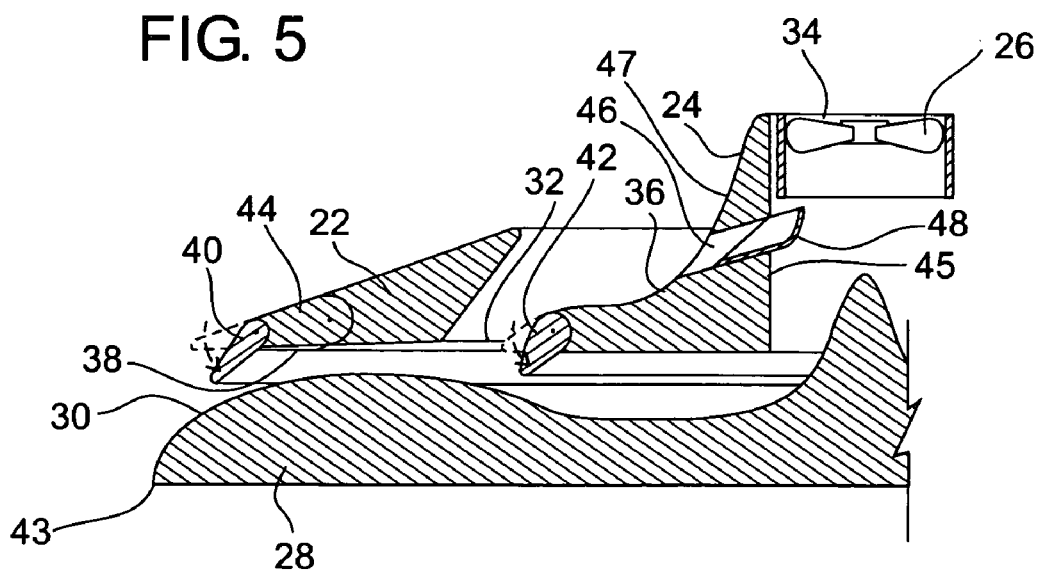

LIFT SYSTEM FOR AN AERIAL CRANE AND PROPULSION SYSTEM FOR A VEHICLE

BACKGROUND OF THE INVENTION

1. Field of the Invention

The present invention relates to ways to provide power to lift objects and propel vehicles. More specifically, it provides a wing configuration to provide lift for an aircraft as well as move vehicles in a horizontal or vertical direction

2. Prior Art

Devices for lifting and rigging heavy equipment have been around for centuries. In fact the rigging used to create one of the seven wonders of the world, the ancient Egyptian pyramids, perplexes engineers and historians to this day. While there are several competing theories, given the technology that was available at that time, it is uncertain how the Egyptians were able to transport and lift the huge stone blocks that make up the pyramids.

Since the time of the Egyptians, the crane and heavy lifting helicopter have emerged as the typical implements used for lifting heavy equipment and material. Cranes are the more cost effective solution of the two. However, cranes have limitations when it comes to height of the lift as well as reach. Cranes can only lift as high as their boom. The height of the boom can be adjusted to a certain extent by increasing the angle between the ground and the boom. But as this angle is increased the reach or distance between the base of the boom and the load being lifted is decreased, thus reducing the reach of the crane. The end result is that in certain situations the crane may be able to lift the load high enough, but at that point the crane is not capable of reaching far enough away from its base to put the load in the desired location.

Another consideration in using a crane is the relationship between the weight of the load and the reach needed for the lift. In order to increase the reach of the crane, the angle between the boom and the ground can be decreased. However, as the reach is increased the lifting capacity of the crane is decreased. This is due to the fact that as the reach is increased the lever arm of the moment about the base of the boom is increased and in turn the moment about the base of the boom is also increased. In the end, the weight of the load as well as the height and reach of the lift must be within the envelope of capability of the crane.

When the lift is outside the capability of the crane it becomes necessary to use a helicopter. The helicopter has the advantage of having an unlimited height and reach on any given lift. However, the weight of the load is a critical limiting factor in using a helicopter to lift equipment and materials. While the load weight limit for a helicopter varies with air density, it is generally not a significant change. It therefore may be necessary to locate and use a larger helicopter due to the weight of the load. The cost involved in using a helicopter can also be prohibitive.

Another drawback of using a helicopter for lifting equipment and materials is that they are mechanically complex and relatively inefficient. They are comprised of thousands of intricate moving parts which are subject to failure. They also rely solely on the direct thrust of the rotors for lift. They do not take advantage of a wing configuration that would create lift from both direct thrust and the differences of pressure created by the Bernoulli principle. As such, the typical helicopter only produces 5 to 12 pounds of lift per horsepower of its engine.

The same power plants used to provide lift in a helicopter can also be used to propel other types of vehicles. Two typical applications would be an airboat and a hovercraft. The airboat floats on the water and is propelled by thrust produced by a reward facing propeller pushing air reward from the boat. Here, as in the helicopter, the force moving the boat forward is limited solely to the direct thrust of the propeller without using a wing configuration to create additional forward force using the Bernoulli principle.

The hovercraft is propelled using the same principles as the airboat. However part of the air on the hovercraft is diverted downward underneath the craft to create a cushion of air on which the hovercraft floats. This allows the craft to move over water as well as land.

SUMMARY OF THE INVENTION

The present invention is a force generating device which can be used to levitate lifting devices such as aerial cranes and propel vehicles. The present invention incorporates a wing configuration to create additional force from an airflow through the use of Bernoulli's principle and the Coanda effect.

One of the objectives of the present invention is to apply the force generating device to an aerial platform which can be used to lift heavy objects in lieu of a helicopter or crane.

Another object of the present invention is to apply the force generating device to propel a vehicle such as an automobile or boat along a horizontal or inclined plane.

Yet another objective of the present invention is to apply the force generating device to a vehicle such as an automobile or boat along a vertical plane.

Other and further objects, features, aspects, and advantages of the present invention will become better understood with the following detailed description of the accompanying drawings.

BRIEF DESCRIPTION OF THE DRAWINGS

The drawings illustrate both the design and utility of alternate embodiments of the present invention, in which:

FIG. 4 is a partial cross-sectional view of the alternate embodiment of the present invention shown in FIG. 3 taken along line 4—4. FIG. 4 shows the bypass in the closed position.

FIG. 5 shows a partial cross-sectional view of another alternate embodiment of the present invention taken along the line 4—4 of FIG. 3. The embodiment in FIG. 5 differs from the one shown in FIG. 4 in that it has dual flaps along the trailing edge of the wing. FIG. 5 also shows the bypass in the open position.

DETAILED DESCRIPTION OF THE PREFERRED EMBODIMENT

Details of illustrative embodiments of the invention are set forth herein. However, it is to be understood that the embodiments describe and exemplify an invention that may take forms different from the specific embodiments disclosed. Structural and functional details are not necessarily to be interpreted as limiting, but rather as a basis for the claims.

Figure 1:
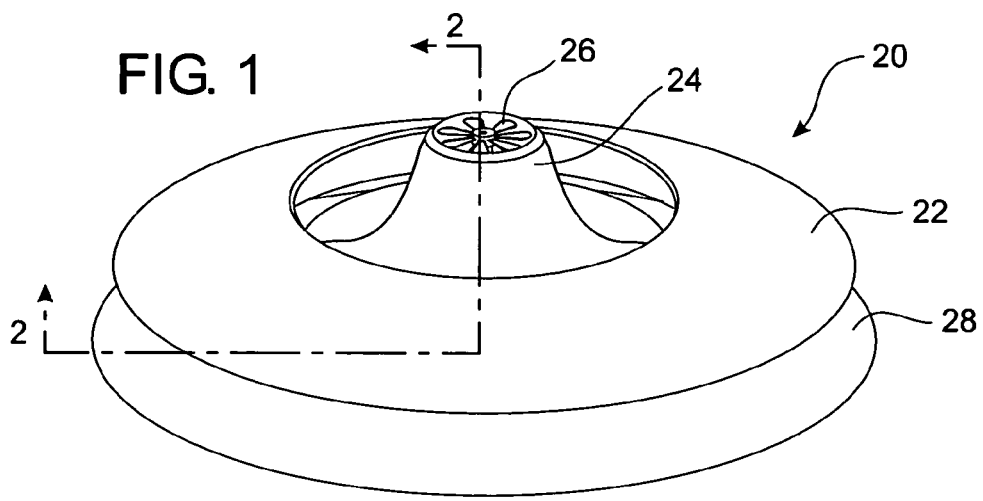
FIG. 1 is a perspective view of one embodiment of the present invention.
Figure 2:
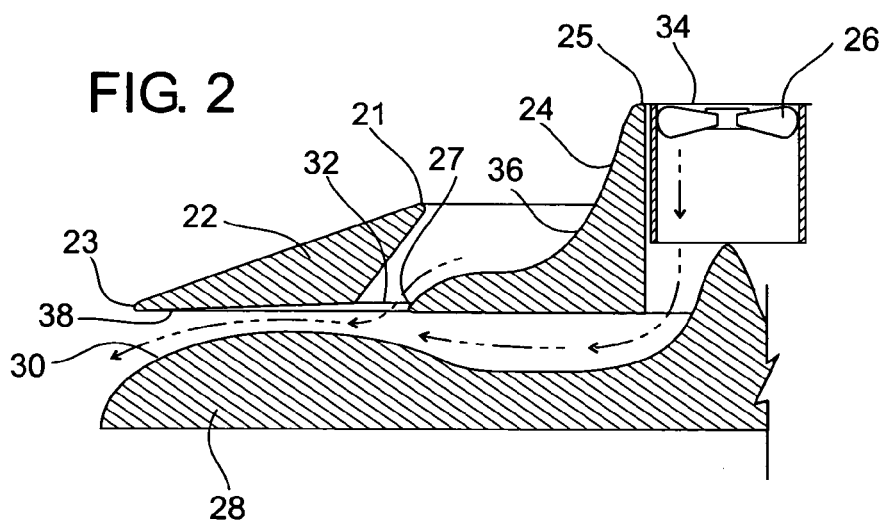
FIG. 2 is a partial cross-sectional view of the embodiment shown in FIG. 1 taken along the line shown in FIG. 1.

FIG. 1 shows a perspective view of a crane 20 containing the preferred embodiment of the present invention as applied to an aerial crane 20. FIG. 2 is a partial cross-sectional view of the crane 20 taken along the line indicated in FIG. 1. The crane 20 has a wing 22 and a coanda 24 extending radially around the airflow inducement mechanism 26. The wing 22 has a leading edge 21 and a trailing edge 23. The coanda 24 also has a leading edge 25 and a trailing edge 27. The airflow inducement mechanism 26 can be a prop or axial fan driven by an internal combustion engine, electrical motor, hydraulic motor, pneumatic motor or any other type of engine capable of providing mechanical force.

The body 28 of the crane 20 is located just below the wing 22 and the coanda 24. The top of the body 28 forms a curved surface 30. The traditional rigging equipment such as hooks, lines, winches, blocks and tackles (not shown) can be attached in the normal fashion to the bottom of the body 28 of the crane 20. There is an opening 32 located between the wing 22 and the coanda 24. The opening 32 extends radially around the outer edge of the coanda 24. The wing 22 and coanda 24 are secured to the body 28 by a series of structural members (not shown), which allow the air to flow with minimal resistance.

When the crane 20 is in use, the airflow inducement mechanism 26 causes a downward airflow as indicated by the arrows in FIG. 2. The air flows down through the center 34 of the crane 20 along the curved surface 30. Airflow through the opening 32 is induced by the airflow along the curved surface 30. The induced airflow causes air to travel down over the top surface 36 of the coanda 24. The air coming through the opening 32 causes the airflow from the center 34 to separate from the bottom side 38 of the wing 22 as it passes between the wing 22 and the curved surface 30. This separation prevents the pressure on the bottom side 38 of the wing 22 from dropping. If the pressure on the bottom side 38 of the wing 22 drops too drastically, it will counteract and cancel out the lift generated pressure drop due to the increased airflow adjacent to the curved surface 30.

The airflow from the opening 32 has a downward direction as it enters the airflow from the center 34. This downward direction helps laminate the airflow from the center 34 onto the curved surface 30. This causes the airflow from the center 34 to compress, thus doubling the mass of air flowing over the curved surface 30 of the body 28. This compression produces a venturi effect on the airflow between the curved surface 30 and the bottom side 38 of the wing 22, thus increasing the velocity of the airflow.

Lift increases exponentially with the increased velocity of the airflow through the system. The increase in the mass and the increase in the velocity created by this arrangement allow the crane 20 to create 29.6 pounds of lift per horsepower, compared to 5 to 12 pounds of lift per horsepower of a typical helicopter.

Figure 3:
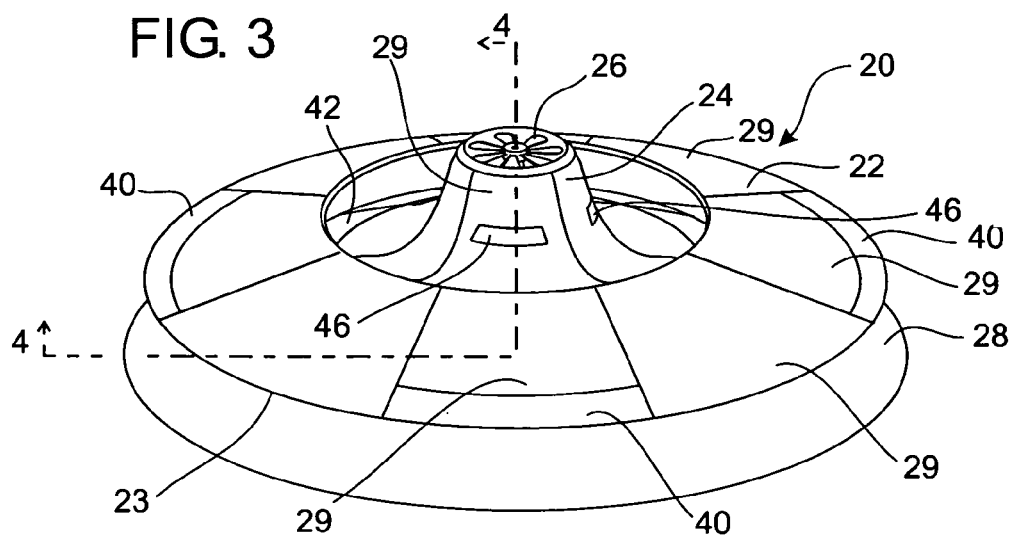
FIG. 3 is a perspective view of an alternate embodiment of the present invention with flaps and a bypass to further control the flow of air.

FIG. 3 is a perspective view of an alternate embodiment of the present invention. FIG. 4 is a cross-sectional view of the embodiment of the crane 20 shown in FIG. 3, taken along the line 4—4. The crane 20 shown in FIGS. 3 and 4 has a set of flaps 40 attached to the trailing edge 23 of the wing 22 and another set of flaps 42 attached to the trailing edge 27 of the coanda 24. The wing 22 and the coanda 24 are constructed of a series of wedge shaped sections 29 extending around to form a complete circle. Both sets of the flaps 40 and 42 are located in every other section 29 of the wing 22 and coanda 24. The alternating sections of flaps 40 and 42 are necessary to avoid interference of movement between adjacent flaps. These flaps 40 and 42 are operated and attached by any means typically known in the aircraft industry, such as solenoids, hydraulics, pneumatics, worm gears, gears, rack and pinions or other mechanical linkages. The flaps 40 and 42 allow the airflow over the curved surface 30 to be further restricted, as well as to direct the airflow. This control of the airflow through the flaps 40 and 42 can be used to cause lateral movement of the crane 20.

FIG. 5 shows yet another embodiment of the present invention which functions the same as the one shown if FIG. 4. The difference between the embodiment shown in FIGS. 4 and 5 is that the embodiment shown in FIG. 5 has a second interior flap 44 located along the trailing edge 23 of the wing 22. The interior flap 44 is pivotally attached to the wing 22. The exterior flap 42 is then pivotally attached to the interior flap 44. These flaps 42 and 44 are located in every other section 29 of the wing 22. Having the two flaps 42 and 44 provides better control in restricting and directing the airflow. It would also be possible to add additional flaps in series to the trailing edge 23 of the wing 22 or the trailing edge 27 of the coanda 24. It would also be possible to attach sets of one or more moveable flaps in series along the trailing edge 43 of the curved surface 30 to aid in the control of the airflow. These flaps or sets of flaps in series would have to be in every other section 29 of the curved surface to avoid interference with adjacent flaps just as done with the flaps on the wing 22 and coanda 24.

FIGS. 3, 4 and 5 show a set of bypasses 46 which allow air to pass through the coanda 24 from the interior surface 45 to the exterior surface 47. The bypass 46 provides additional control of the airflow for controlling lift, stability and maneuverability. Each bypass 46 is equipped with a gate 48 which is used to control the flow of air through it. FIG. 4 shows the bypass gate 48 in the closed position. FIG. 5 shows the bypass gate 48 in the open position. The gate can be slidingly or pivotally attached to the bypass 46. Other forms of articulated or moveable attachment would also work for attaching the gates 48. The gate 48 can be operated by any means commonly known in the art, including solenoids, hydraulics, pneumatics, worm gears or other mechanical linkages.

Figure 6:
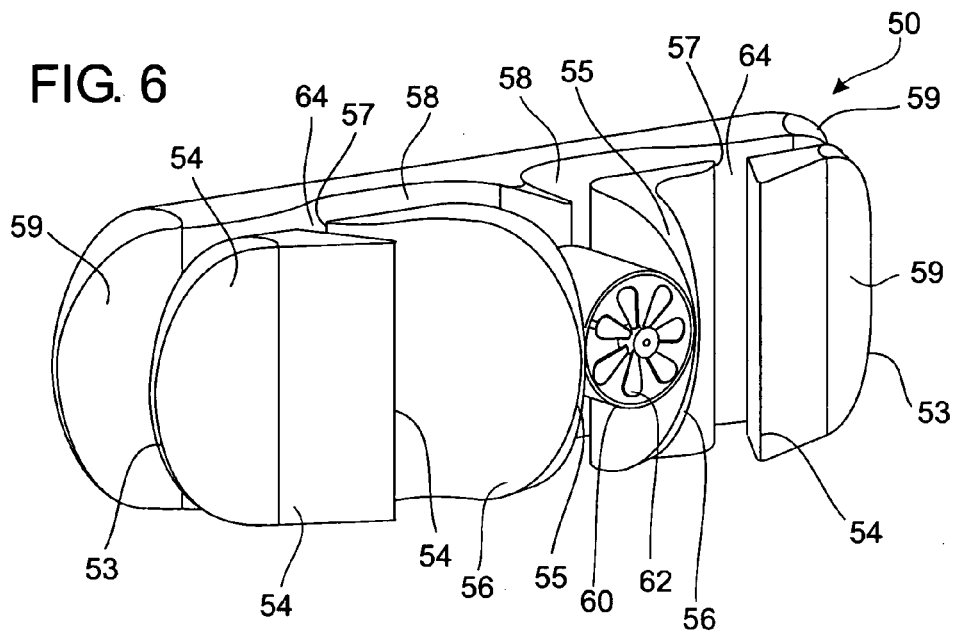
FIG. 6 is a perspective view of one embodiment of the propulsion system of the present invention.
Figure 7:
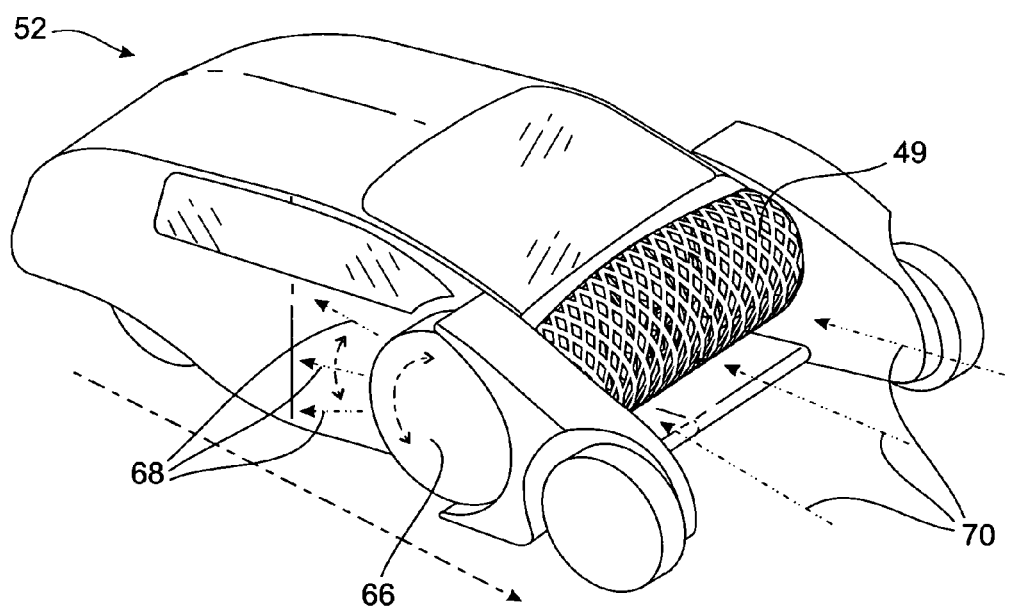
FIG. 7 is a perspective view of a wheeled vehicle incorporating the propulsion system shown in FIG. 6.

FIG. 6 shows the preferred embodiment of the present invention as applied to a propulsion system 50 for a vehicle 52. FIG. 7 shows a wheeled vehicle 52 with a propulsion system 50 behind a grill 49. However, it should be noted that the propulsion system 50 can also be used on watercraft, hovercraft or other types of vehicles.

The propulsion system 50 has a wing 54, a coanda 56 and a curved surface 58 similar to that found in the crane 20 shown in FIGS. 1 through 5. However, the wing 54, coanda 56 and curved surface 58 of the propulsion system 50 are laid out in a linear form versus the circular form seen in FIGS. 1 through 5. The propulsion system 50 has an opening 60 at the center with an airflow inducement mechanism 62. Note the layout of the wing 54, coanda 56 and curved surface 58 are similar to those parts of the crane 20 shown in FIGS. 1 through 5, i.e. there is an opening between the wing 54 and coanda 56 and a passageway along the curved surface 58 formed by the wing 54 and coanda 56 on one side and the curved surface 58 on the other side. As such, the wing 54, coanda 56 and curved surface 58 all operate in the same manner as that disclosed for the embodiment shown in FIGS. 1 through 5 to help generate a force to propel the vehicle 52. The wing 54 has a leading edge 51 and a trailing edge 53. The coanda 56 has a leading edge 55 and a trailing edge 57. Just as in the crane 20 application shown in FIG. 3, one or more flaps 59 can be attached to the trailing edge 53 of the wing 54, the trailing edge 57 of the coanda 56 and curved surface 58 of the propulsion system 50 to control the airflow and direction of thrust.

Figure 8:
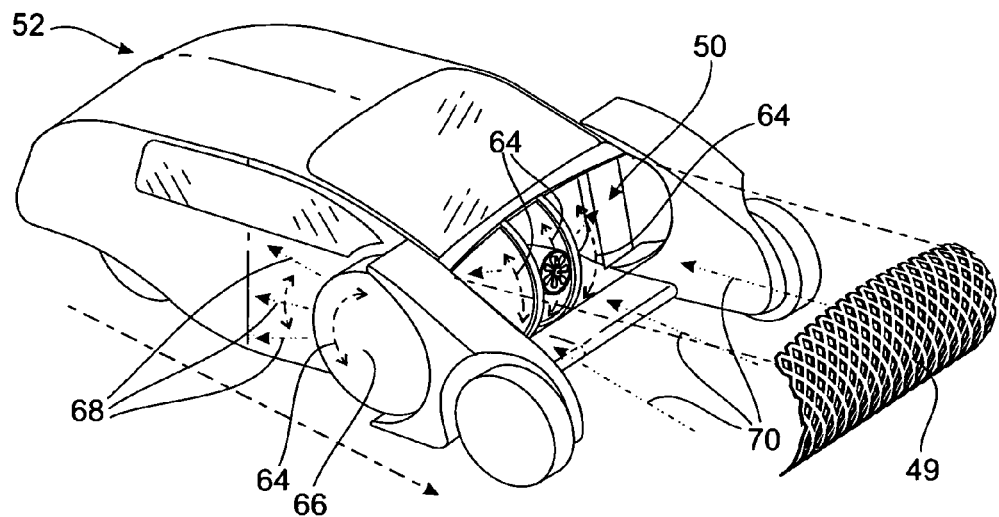
FIG. 8 is an exploded perspective view of the wheeled vehicle shown in FIG. 7.
Figure 9:
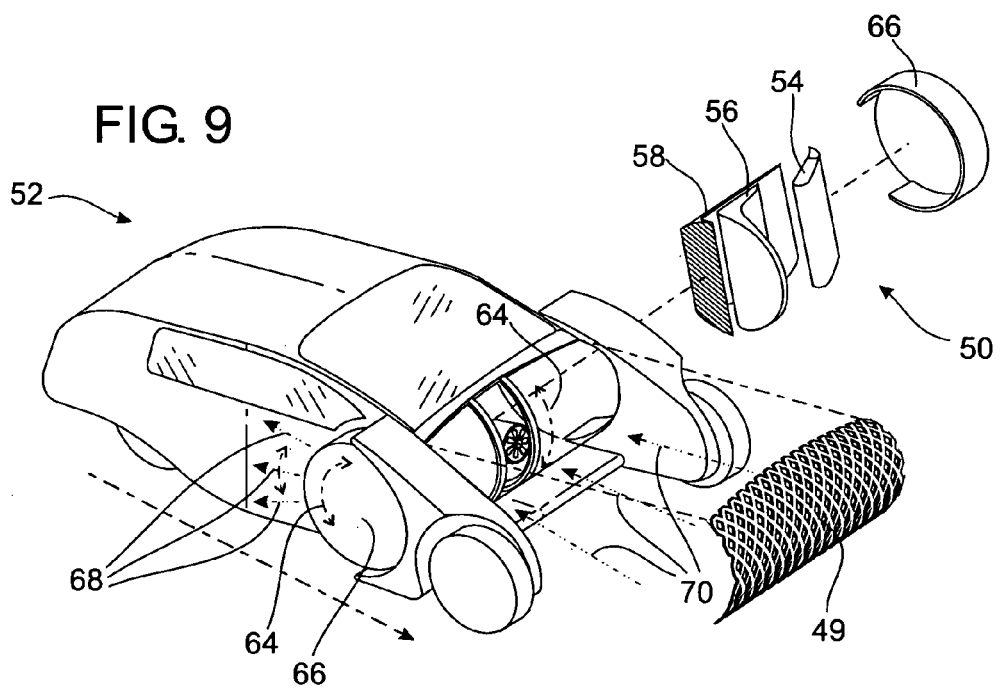
FIG. 9 is a further exploded perspective view of FIG. 8.

The propulsion system 50 can be rotatably mounted in the vehicle 52, as indicated by the arrows 64 in FIGS. 7, 8 and 9. When the propulsion system 50 is in front of the vehicle 52, it creates a forward propelling force comprised of the "lift" and thrust to help move the car in a forward direction. The propulsion system 50 creates a "lift" due to pressure differences created by the flow of air over the wing 54, coanda 56 and curved surface 58. Because the propulsion system 50 when in use is typically oriented so the wing 54, coanda 56 and curved surface 58 are vertical, the "lift" becomes a forward moving force. The thrust can be directed using the flaps 59, covers 66 and rotation of the propulsion system 50 to create a forward moving force. Likewise, the propulsion system 50 can be rotated to produce a force to lift the front end of the vehicle 52.

FIG. 7 shows a perspective view of a vehicle 52 with the propulsion system 50 rotatably mounted in front of the vehicle 52 behind a grill 49. Both ends of the propulsion system 50 can be fitted with a cover 66 which helps redirect the flow of the air as indicated by the arrows 68. The flow of the intake air is indicated by the arrows 70. FIG. 8 shows an exploded view of the vehicle 52 shown in FIG. 7. The grill 49 is removed to reveal the propulsion system 50. FIG. 9 shows a further exploded view of the vehicle 52 with a propulsion system 50. One half of the propulsion system 50 is exploded to the side to show the various parts, including the curved surface 58, the coanda 56, the wing 54 and the cover 66. These same components have corresponding components laid out in a mirror image of them on the other side of the air inducement mechanism 62.

From the foregoing description, one skilled in the art can readily ascertain the essential characteristics of the invention and, without departing from the spirit and scope thereof, can adapt the invention to various usages and conditions. Changes in form and the substitution of equivalents are contemplated as circumstances may suggest or render expedient; and although specific terms have been employed herein, they are intended in a descriptive sense and not for purposes of limitation, the purview of the invention being delineated in the following claims.

What is claimed is:

1. A propulsion system comprising:
   an airflow inducement mechanism;
   a coanda comprising a leading edge and a trailing edge;
   a wing comprising a leading edge and a trailing edge; and
   a base having a curved surface;
   the coanda is located adjacent the airflow inducement mechanism;
   the wing is located adjacent the coanda such that there is a gap between the coanda and the wing;
   wherein the coanda and wing are mounted above the curved surface so that it defines a passageway between the curved surface and the wing and the coanda such that a first airflow generated by the airflow inducement mechanism flows through the passageway and induces a second airflow through the gap between the coanda and the wing, the second airflow creates a venturi in the passageway causing the velocity and density of the first airflow to increase, the second airflow creates a lift, the lift comprising lift generated by a Bernoulli principle acting on the curved surface and exits radially outward from the passageway.

2. A propulsion system as claimed in claim 1, further comprising a moveable flap attached to the trailing edge of the coanda.

3. A propulsion system as claimed in claim 2, wherein the moveable flap is comprised of a plurality of flaps.

4. A propulsion system as claimed in claim 1, further comprising a moveable flap attached to the trailing edge of the wing which can redirect the second airflow downward.

5. A propulsion system as claimed in claim 4, wherein the moveable flap is comprised of a plurality of flaps.

6. A propulsion system as claimed in claim 1, further comprising a movable flap attached to the trailing edge of the curved surface.

7. A propulsion system as claimed in claim 6, wherein the moveable flap is comprised of a plurality of flaps.

8. A propulsion system as claimed in claim 1, wherein the propulsion system is attached to a wheeled conveyance.

9. A propulsion system as claimed in claim 1, wherein the propulsion system is attached to a watercraft.

10. A propulsion system as claimed in claim 1, wherein the propulsion system is attached to a hovercraft.

11. A propulsion system as claimed in claim 1, wherein the propulsion system is rotationally attached to a wheeled conveyance.

12. A propulsion system as claimed in claim 1, wherein the propulsion system is rotationally attached to a watercraft.

13. A propulsion system as claimed in claim 1, wherein the propulsion system is rotationally attached to a hovercraft.

14. A propulsion system as claimed in claim 1, wherein the airflow inducement mechanism is a fan driven by an internal combustion engine.

15. A propulsion system as claimed in claim 1, wherein the airflow inducement mechanism is a fan driven by an electric motor.

16. A propulsion system as claimed in claim 1, wherein the airflow inducement mechanism is a fan driven by a hydraulic motor.

17. A propulsion system as claimed in claim 1, wherein the airflow inducement mechanism is a fan driven by a pneumatic motor.

18. A propulsion system comprising:
   an airflow inducement mechanism;
   a coanda comprising a leading edge and a trailing edge;
   a wing comprising a leading edge and a trailing edge;
   a base having a curved surface with a trailing edge;
   one or more flaps attached to the trailing edge of the coanda;
   one or more flaps attached to the trailing edge of the wing; and
   one or more flaps attached to the trailing edge of the curved surface;
   wherein the coanda is located adjacent the airflow inducement mechanism;
   the wing is located adjacent the coanda such that there is a gap between the coanda and the wing;
   wherein the coanda and wing are mounted above the curved surface so that it defines a passageway between the curved surface and the wing and the coanda such that a first airflow generated by the airflow inducement mechanism flows through the passageway and induces a second airflow through the gap between the coanda and the wing, the second airflow creates a venturi in the passageway causing the velocity and density of the first airflow to increase, the second airflow creates a lift, the lift comprising lift generated by a Bernoulli principle acting on the curved surface and exits radially outward from the passageway, wherein the flap or flaps on the trailing edge of the wing can redirect the second airflow downward.

19. A crane comprising:
a generally circular shaped body with a center and a curved surface;
the curved surface having a trailing edge;
an air flow inducement mechanism located above the curved surface at the center of the body;
a coanda extending radially outward from the center of the body and surrounding the airflow inducement mechanism and having an interior surface, an exterior surface, a trailing edge; and
a wing extending radially around the coanda and having a trailing edge;
wherein the coanda and wing are mounted above the curved surface so that it defines a passageway between the curved surface and the wing and the coanda such that a first airflow generated by the airflow inducement mechanism flows through the passageway and induces a second airflow through the gap between the coanda and the wing, the second airflow creates a venturi in the passageway causing the velocity and density of the first airflow to increase, the second airflow creates a lift, the lift comprising lift generated by a Bernoulli principle acting on the curved surface and exits radially outward from the passageway, wherein the flap or flaps on the trailing edge of the wing can redirect the second airflow downward.

20. A crane as claimed in claim 19, further comprising a moveable flap attached to the trailing edge of the coanda.

21. A crane as claimed in claim 20, wherein the moveable flap is comprised of a plurality of flaps.

22. A crane as claimed in claim 19, further comprising a moveable flap attached to the trailing edge of the wing.

23. A crane as claimed in claim 22, wherein the moveable flap is comprised of a plurality of flaps.

24. A crane as claimed in claim 19, wherein the airflow inducement mechanism is a fan driven by an internal combustion engine.

25. A crane as claimed in claim 19, wherein the airflow inducement mechanism is a fan driven by an electric motor.

26. A crane as claimed in claim 19, wherein the airflow inducement mechanism is a fan driven by a hydraulic motor.

27. A crane as claimed in claim 19, wherein the airflow inducement mechanism is a fan driven by a pneumatic motor.

28. A crane as claimed in claim 19, further comprising a moveable flap attached to the trailing edge of the curved surface.

29. A crane as claimed in claim 28, wherein the moveable flap is comprised of a plurality of flaps.

30. A crane as claimed in claim 19, further comprising a bypass between the interior surface of the coanda and the exterior surface of the coanda.

31. A crane as claimed in claim 30, further comprising a moveable gate located in the bypass.

32. A crane as claimed in claim 31, wherein the moveable gate is operated by hydraulics.

33. A crane as claimed in claim 31, wherein the moveable gate is operated by pneumatics.

34. A crane as claimed in claim 31, wherein the moveable gate is operated by a mechanical linkage.

35. A crane comprising:
a generally circular shaped body with a center and a curved surface;
an air flow inducement mechanism located above the curved surface at the center of the body;
the curved surface having a trailing edge;
a coanda extending radially outward from the center of the body and surrounding the airflow inducement mechanism and having an interior surface, an exterior surface and a trailing edge;
a wing extending radially around the coanda and having a trailing edge;
one or more flaps moveable attached to the trailing edge of the coanda;
one or more flaps moveable attached to the trailing edge of the wing;
one or more flaps moveably attached to the trailing edge of the curved surface; and
a bypass between the interior surface of the coanda and the exterior surface of the coanda, the bypass having a moveable gate;
wherein the coanda and wing are mounted above the curved surface so that it defines a passageway between the curved surface and the wing and the coanda such that a first airflow generated by the airflow inducement mechanism flows through the passageway and induces a second airflow through the gap between the coanda and the wing, the second airflow creates a venturi in the passageway causing the velocity and density of the first airflow to increase, the second airflow creates a lift, the lift comprising lift generated by a Bernoulli principle acting on the curved surface and exits radially outward from the passageway or can be directed downward by the flap or flaps on the trailing edge of the wing.

* * * * *